(12) United States Patent
Fischer et al.

(10) Patent No.: US 6,435,810 B1
(45) Date of Patent: Aug. 20, 2002

(54) WEAR RESISTANT FUEL PUMP

(75) Inventors: John Gardner Fischer, Goodrich; John J. Giacchina, Davison; Ismat Ali Abu-Isa, Rochester Hills, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/692,934

(22) Filed: Oct. 20, 2000

(51) Int. Cl.[7] .................................................. F04D 5/00
(52) U.S. Cl. ...................................................... 415/55.1
(58) Field of Search ............................ 415/55.1, 173.4, 415/174.4; 416/241 A, 241 B

(56) References Cited

U.S. PATENT DOCUMENTS

| | | | | |
|---|---|---|---|---|
| 3,876,579 A | * | 4/1975 | Hallstrom et al. | 260/37 |
| 5,052,464 A | * | 10/1991 | Natori | 164/80 |
| 5,409,357 A | * | 4/1995 | Yu et al. | 417/423.1 |
| 6,095,771 A | * | 8/2000 | Schelhas et al. | 417/423.14 |

* cited by examiner

*Primary Examiner*—F. Daniel Lopez
*Assistant Examiner*—Dwayne White
(74) *Attorney, Agent, or Firm*—Vincent A. Cichosz

(57) ABSTRACT

A wear resistant fuel pump for a vehicle includes a pump section having a flow channel and a rotatable impeller cooperating with the flow channel. The wear resistant fuel pump also includes a motor section disposed adjacent the pump section and having a motor to rotate the impeller. The wear resistant fuel pump further includes an outlet section disposed adjacent the motor section to allow pumped fuel to exit the fuel pump. The pump section includes a plurality of plates disposed axially adjacent to and cooperating with the impeller. The impeller and plates are made of a compound having an abrasion wear resistance on a predetermined surface that improves abrasion wear characteristics.

22 Claims, 2 Drawing Sheets

WEAR RESISTANT FUEL PUMP

TECHNICAL FIELD

The present invention relates generally to fuel pumps for vehicles and, more particularly, to a wear resistant fuel pump for a vehicle.

BACKGROUND OF THE INVENTION

It is known to provide a fuel tank in a vehicle to hold fuel to be used by an engine of the vehicle. It is also known to provide a fuel pump to pump fuel from the fuel tank to the engine. One type of fuel pump is known as a high-pressure turbine fuel pump. The high-pressure turbine fuel pump typically includes a plastic impeller rotatable between anodized aluminum plates. The anodized aluminum material of the plates provides for a hard abrasion wear resistant surface. However, a die casting process used to form the plates limits the geometric complexity and surface smoothness of a flow channel and port areas of the plates. Also, secondary operations are required for surface anodization and insertion of a journal bearing. Improved geometry and surface smoothness can be obtained using injection or compression molded plastic plates. However, plastic plates have traditionally been limited in their applications due to poor abrasion wear resistance. Otherwise, the sealing surfaces of the plates wear, resulting in a reduction of fluid flow output.

Therefore, it is desirable to improve the abrasive wear characteristics of plastic plates in a fuel pump for a vehicle. It is also desirable to provide a wear resistant fuel pump for a vehicle. It is further desirable to provide a method of introducing wear resistant filler to only the surface of interest of the plastic plates to improve the abrasion wear resistance of a fuel pump for a vehicle.

SUMMARY OF THE INVENTION

It is, therefore, one object of the present invention to provide a wear resistant fuel pump for a vehicle.

It is another object of the present invention to provide a method of introducing wear resistant filler material to only a surface of interest of plastic plates in a fuel pump for a vehicle.

To achieve the foregoing objects, the present invention is a wear resistant fuel pump for a vehicle including a pump section having a flow channel and a rotatable impeller cooperating with the flow channel to pump fuel therethrough. The wear resistant fuel pump also includes a motor section disposed adjacent the pump section and having a motor to rotate the impeller. The wear resistant fuel pump further includes an outlet section disposed adjacent the motor section to allow pumped fuel to exit the fuel pump. The pump section includes a plurality of plates disposed axially adjacent to and cooperating with the impeller. The impeller and plates are made of a compound having an abrasion wear resistance on a predetermined surface thereof that improves abrasion wear characteristics therebetween.

One advantage of the present invention is that a wear resistant fuel pump is provided for a vehicle. Another advantage of the present invention is that the wear resistant fuel pump introduces an abrasive wear material to only the surface requiring wear enhancement. Yet another advantage of the present invention is that the wear resistant fuel pump improves fuel pump performance and durability in abrasive contaminant environments. A further advantage of the present invention is that the wear resistant fuel pump reduces cost compared to other exotic material options such as ceramic material due to applying high cost abrasion wear materials to only the surface requiring wear enhancement.

Other objects, features and advantages of the present invention will be readily appreciated, as the same becomes better understood, after reading the subsequent description taken in conjunction with the accompanying drawings.

DESCRIPTION OF THE PREFERRED EMBODIMENT

Figure 1:
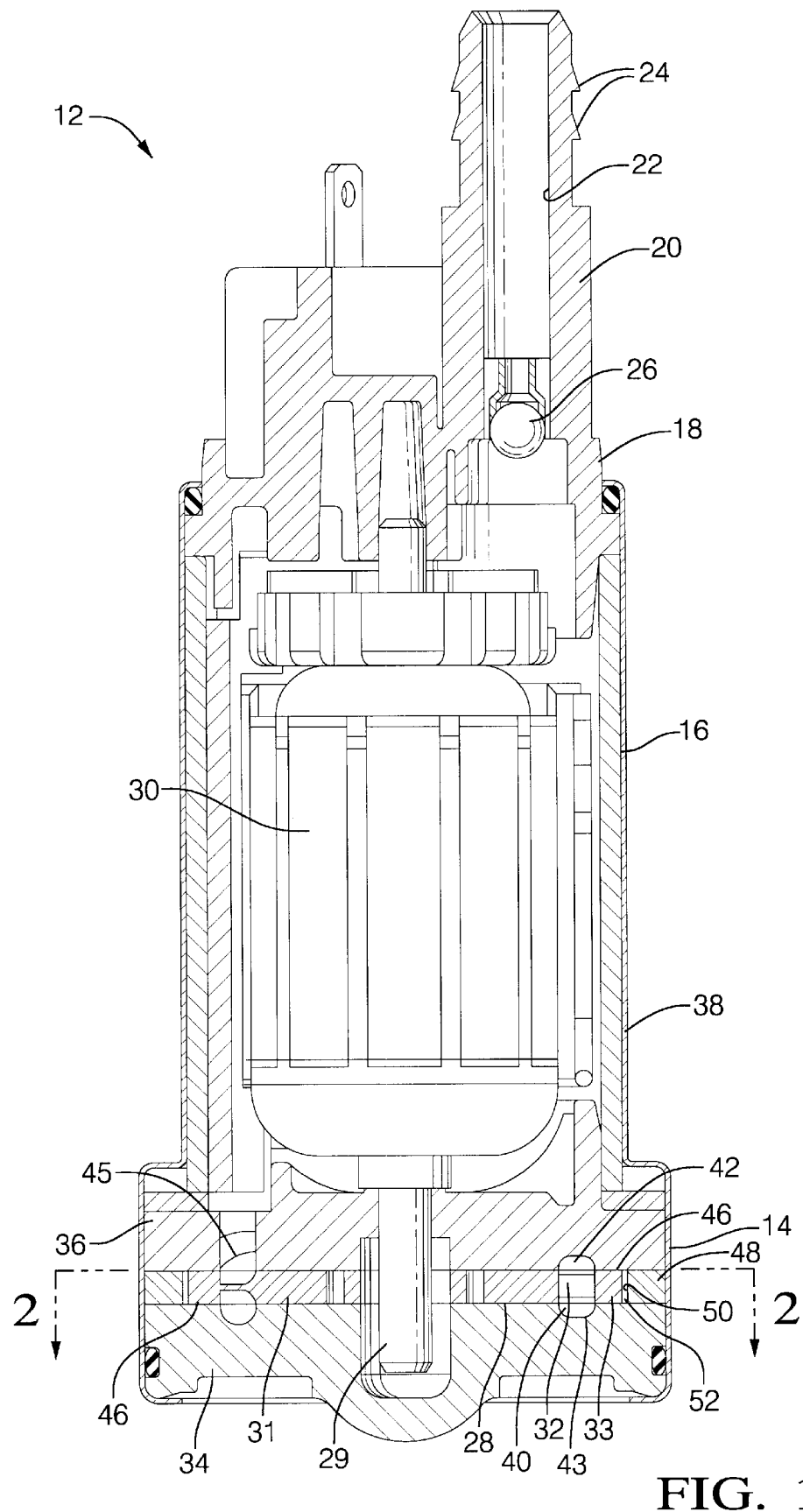
FIG. 1 is a fragmentary elevational view of a wear resistant fuel pump, according to the present invention.
Figure 2:
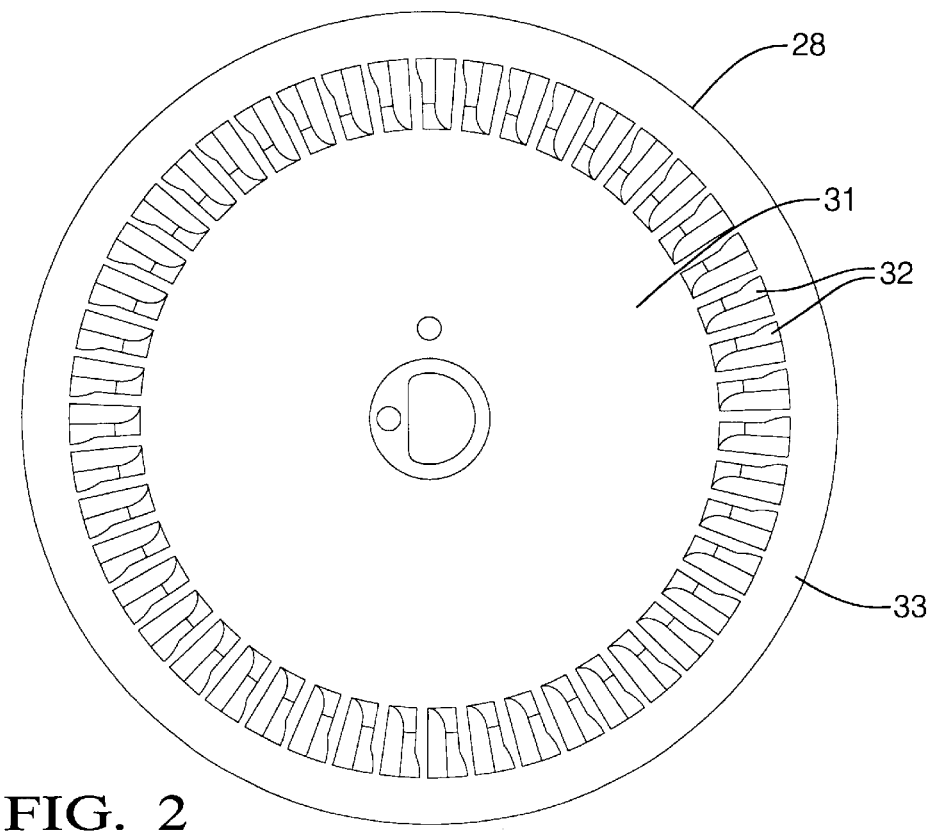
FIG. 2 is a sectional view taken along line 2—2 of FIG. 1.

Referring to the drawings and in particular FIGS. 1 and 2, one embodiment of a wear resistant fuel pump 12, according to the present invention, is shown for a vehicle (not shown). The wear resistant fuel pump 12 includes a pump section 14 at one axial end, a motor section 16 adjacent the pump section 14 and an outlet section 18 adjacent the motor section 16 at the other axial end. As known in the art, fuel enters the pump section 14, which is rotated by the motor section 16, and is pumped past the motor section 16 to the outlet section 18. The outlet section 18 has an outlet member 20 extending axially with a passageway 22 extending axially therethrough. The outlet member 20 also has a plurality of projections or barbs 24 extending radially outwardly for attachment to a conduit (not shown). The outlet member 20 also includes a check valve 26 disposed in the passageway 22. It should be appreciated that the fuel flowing to the outlet section 18 flows into the outlet member 20 and through the passageway 22 and check valve 26 when open to the conduit. It should also be appreciated that, except for the pump section 14, the fuel pump 12 is conventional and known in the art.

Referring to FIGS. 1 and 2, the pump section 14 includes an impeller 28 mounted to a rotatable shaft 29 of a motor 30 of the motor section 16 for rotation therewith. The impeller 28 is generally planar and circular in shape. The impeller 28 has a hub portion 31 attached to the shaft 29 by suitable means (not shown) The impeller 28 also has a plurality of blade tips 32 extending radially from the hub portion 31 and disposed circumferentially thereabout. The impeller 28 has a peripheral ring portion 33 extending radially from the blade tips 32 to shroud the blade tips 32. The impeller 28 is made of a plastic material to be described.

The pump section 14 also includes an inlet plate 34 disposed axially on one side of the impeller 28 and an outlet plate 36 disposed axially on the other side of the impeller 28. The inlet plate 34 and outlet plate 36 are generally planar and circular in shape. The inlet plate 34 and outlet plate 36 are enclosed by a housing 38 and fixed thereto. The inlet plate 34 and outlet plate 36 have an inlet or first recess 40 and an outlet or second recess 42, respectively, located axially opposite the blade tips 32 adjacent to the peripheral ring portion 33 to form a flow channel 43 for a function to be described. The recesses 40 and 42 are annular and allow fuel to flow therethrough from an inlet port (not shown) to an outlet port 45 of the pump section 14. The peripheral ring portion 33 of the impeller 28 forms an outside diameter (OD) sealing surface 46 on both axial sides thereof with the inlet plate 34 and outlet plate 36. It should be appreciated that the impeller 28 rotates relative to the inlet plate 34 and outlet plate 36 and the inlet and outlet plates 34 and 36 are stationary.

The pump section 14 also includes a spacer ring 48 disposed axially between the inlet plate 34 and outlet plate 36 and spaced radially from the impeller 28. The spacer ring 48 is fixed to the housing 38 and is stationary relative to the impeller 28. The spacer ring 48 is generally planar and circular in shape. The spacer ring 48 has an inner diameter 50 that is spaced from the outside diameter of the peripheral portion 33 of the impeller to form an outside diameter (OD) cavity 52 between the inner diameter 50 of the spacer ring 48 and an outside diameter of the peripheral ring portion 33 of the impeller 28. It should be appreciated that fluid flows through both the inlet plate recess 40 and the outlet plate recess 42 and enters both recesses 40 and 42 at the inlet port region and exits out the outlet port region. It should also be appreciated that abrasion wear resistant material is required on plate and impeller sealing surfaces.

Figure 4:
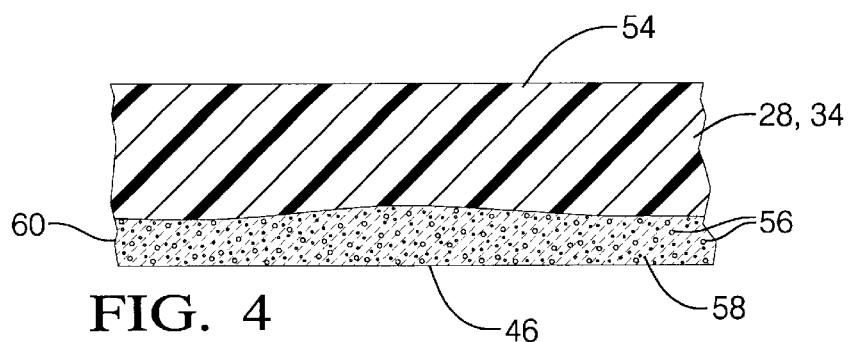
FIG. 4 is a fragmentary elevational view of the portion made with the mold of FIG. 3.

The impeller 28, inlet plate 34 and/or outlet plate 36 are made of a plastic compound having an abrasive wear resistance. The plastic compound is a plastic base resin material 54 and an abrasion wear resistant filler material 56 (FIG. 4). The base resin material 54 is a plastic material such as phenolic and the filler material 56 is an abrasion wear resistant material, for example Zirconium Oxide, $R_c$=71, silica, ceramic spheres, at the surface of the base resin material 54 that has a hardness equal to or greater than the hardness of an abrasive contaminant, for example quartz, $R_c$=64, ingested by the fuel pump 12 during operation and causing abrasive wear. The concentration and size of the filler material 56 is selected such as zirconium oxide with a 40 micron typical particle size. The filler material 56 is in a crushed or beaded form. The filler material 56 is bounded together with a binder 58 such as a low molecular weight phenolic liquid or powdered resin to form a micro-porous insert 60. The binder 58 also produces a good bond between the base resin material 54 and the filler material 56 and combine attributes of impact resistance to prevent chipping and cross-link density to improve tear resistance. The low molecular weight of the resin for the binder 58 is ductile and formable at molding temperatures, which allows the insert 60 to comply with the shape of a mold 62 to be described.

A plastic molding process, injection or compression, is used to make fuel pump parts such as the impeller 28, inlet plate 34 and/or outlet plate 36 with a high content of filler material 56 at the surface and the base resin material 54 throughout the remaining portion. The highly filled surface is micro-porous and allows the base resin material 54 to penetrate and fill the voids within the micro-porous insert 60 and establish a bond with particles of the filler material 56. The insert 60 has adequate porosity to allow the plastic base resin material 54 to flow through and be of a proper material or coating to form a bond with the base resin material 54. For example, the insert 60 may be made of filler material 56 in the form of beads of ZrO2 coated with the binder 58 of low molecular weight phenolic resin. The insert 60 could be pressed into a disc of proper geometry to fit a mold cavity of a mold 62 to be described. The bead size of the filler material 56, coating material, pressure and temperature is optimized to create the desired porosity of the insert 60. It should be appreciated that small holes could be pressed into the insert 60 to improve material flow through the surface.

The compound may be modified by increasing the cross-link density to harden the base resin material 54 and improve its tear strength. Eight formulations have been developed to investigate the effects of filler material types, degree of cure and impact strength modifiers on abrasion resistance. The results and formulations are shown in Table 1 below. Composition and Abrasion Properties of Phenolic Compounds

TABLE 1

| | Formulations, Percent by Weight | | | | | | | |
|---|---|---|---|---|---|---|---|---|
| | PR-1 | PR-2 | 1 | 2 | 3 | 4 | 5 | 6 |
| Ingredients (wt. %) | | | | | | | | |
| Phenolic Binder Plenco 12390 | 5 | 5 | 10 | 10 | 10 | 10 | 10 | 10 |
| Zirconium Oxide | 95 | — | 90 | — | — | — | 88 | 87 |
| Novakup 200 Malvern Microcrystalline Silica, Platy, Treated | — | 95 | — | 90 | — | — | — | — |
| Zeospheres G-800 3M Ceramic Spheres | — | — | — | — | 90 | 89 | — | — |
| Paphen PHGF Phenoxy Resin Phenoxy Specialties Co. | — | — | — | — | 0 | — | 2 | 2 |
| Hexa, Plenco Hexamethylene Tetraamine, Curing agent | — | — | — | — | — | 1 | — | 1 |
| Degree of Abrasion (g) | 0.404 | 0.365 | 0.293 | 2.328 | 2.275 | 0.463 | 0.219 | 0.046 |

The above formulations are examples of compositions of the compound that would improve abrasion resistance and enhance durability of fuel pump parts. Without increased cure and without the presence of impact strength modifiers, zirconia is superior to silica or ceramic spheres in abrasion resistance. Significant improvements in abrasion resistance are observed when the degree of cure is increased by adding 1% additional Hexa (compare formulation 3 & 4). Comparing formulation PR-1 and 5, it should be noted that the addition of an impact strength modifier, Paphen PHGF, also improves abrasion resistance, even for a formulation that already has appreciable abrasion resistance. Addition of both curative and impact modifiers lead to much improved abrasion resistance as seen in the case of formulation 6.

Figure 3:
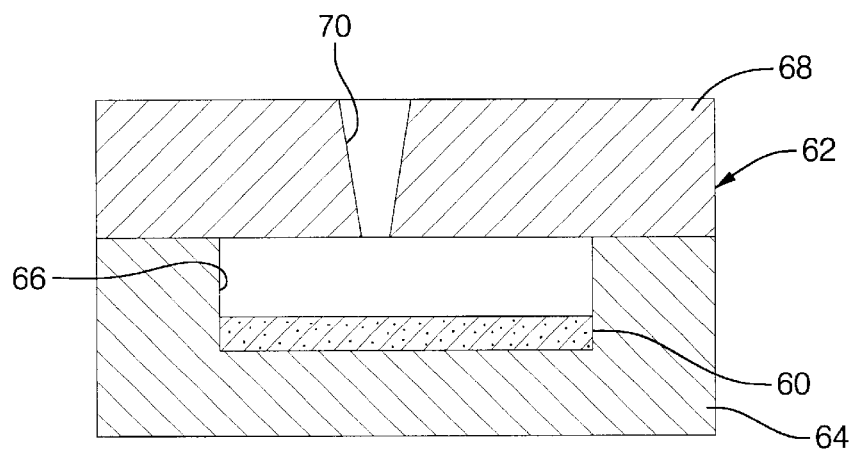
FIG. 3 is a fragmentary elevational view of a mold for making a portion of the wear resistant fuel pump of FIG. 1.

Referring to FIGS. 3 and 4, a method, according to the present invention, of introducing wear resistant filler material 56 to only a surface of interest of plastic plates 28,34,36 in the fuel pump 12 is shown. The method includes the steps of forming a porous insert 60 of the desired abrasion wear resistant filler material 56 by insert molding a preformed or pilled layer on the surface that the wear resistance is required. As illustrated in FIG. 3, a mold, generally indicated at 62, has a first mold half 64 with a mold cavity 66 and a second mold half 68 adjacent the first mold half 64. The second mold half 68 includes an injection gate 70 for injection molding the plastic material. The insert 60 is preformed with a high porosity to allow plastic material flow therethrough. The method includes the step of inserting the insert 60 into the mold cavity 66. The method includes performing the plastic molding process by injecting the base resin material 54 through the injection gate 70 to fill the mold cavity 66 to create a plastic plate 28,34,36 having a high content filler material 56 at the desired wear resistant surface and the base resin material 54 throughout the remaining portion. The injection of plastic flow pressure holds the insert 60 against the desired tool steel of the mold 62. As illustrated in FIG. 4, a finished molded pump part such as the impeller 28 and/or plates 34,36 includes a typical plastic layer of base resin material 54, bonded to a wear resistant insert 60. The insert 60 consists of a wear resistant filler material 56 and a low molecular weight phenolic resin 58. It should be appreciated that the insert 60 is of adequate porosity, prior to molding, to allow the plastic to flow through and produce a diffusion zone consisting of a high concentration of wear resistant filler material 56 and plastic base resin material 54. It should also be appreciated that the method applies a desired abrasion wear resistance filler material 56 to the wear interfaces of interest by insert molding a preformed wear resistant insert 60 to the surface of interest.

In another embodiment, an electostatic or plasma spraying of the desired filler material 56 onto the tool steel surface of the mold 62 prior to molding may be used to achieve the same highly filled surface as described above. In this process, the surface treatment and/or filler material 56 must be compatible with the plastic base resin material 54 to form a bond. The density of the spray coating must remain of adequate porosity to allow the plastic base resin material 54 to flow through.

In yet another embodiment, a two step molding process may be used to achieve the same highly filled surface as described above. In this process, a first plastic compound of the base resin material 54 is introduced into the mold 62. Next, a second plastic compound containing a high concentration of the abrasion wear resistant filler material 56 is introduced into the mold 62 at the desired surface. The second plastic compound is conducted while the first plastic compound is uncured. It should be appreciated that this will aid in the bonding between the two components.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A wear resistant fuel pump for a vehicle comprising:
    a pump section having a flow channel and a rotatable impeller cooperating with said flow channel to pump fuel therethrough;
    a motor section disposed adjacent said pump section and having a motor to rotate said impeller;
    an outlet section disposed adjacent said motor section to allow pumped fuel to exit said fuel pump;
    said pump section including a plurality of plates disposed axially adjacent to and cooperating with said impeller, said impeller and said plates being made of a compound having an abrasion wear resistance on a predetermined surface thereof that improves abrasion wear characteristics therebetween; and
    wherein said compound comprises a base resin material and a filler material.

2. A wear resistant fuel pump as set forth in claim 1 including a binder to bind said filler material together to form a porous insert.

3. A wear resistant fuel pump as set forth in claim 1 wherein said impeller has a hub portion, a plurality of blades disposed circumferentially along said hub portion, and a peripheral ring portion extending radially from said blades having an axial sealing surface on both sides thereof.

4. A wear resistant fuel pump as set forth in claim 1 wherein said filler material has a hardness greater than 65 Rc.

5. A wear resistant fuel pump as set forth in claim 1 wherein said filler material is in the form of beads.

6. A wear resistant fuel pump as set forth in claim 1 wherein said filler material is an abrasion wear resistant material comprising one of $ZrO_2$, silica, alumina, and ceramic spheres.

7. A wear resistant fuel pump for a vehicle comprising:
    a pump section having a flow channel and a rotatable impeller cooperating with said flow channel to pump fuel therethrough;
    a motor section disposed adjacent said pump section and having a motor to rotate said impeller;
    an outlet section disposed adjacent said motor section to allow pumped fuel to exit said fuel pump;
    said pump section including a plurality of plates disposed axially adjacent to and cooperating with said impeller, said impeller and said plates being made of a compound having an abrasion wear resistance on a predetermined surface thereof that improves abrasion wear characteristics therebetween;
    said compound comprising a base resin material and a filler material;
    a binder to bind said filler material together to form a porous insert; and
    wherein said binder is a low molecular weight phenolic resin.

8. A wear resistant fuel pump for a vehicle comprising:
    a pump section having a flow channel and a rotatable impeller cooperating with said flow channel to pump fuel therethrough;
    a motor section disposed adjacent said pump section and having a motor to rotate said impeller;
    an outlet section disposed adjacent said motor section to allow pumped fuel to exit said fuel pump;
    said pump section including a plurality of plates disposed axially adjacent to and cooperating with said impeller, said impeller and said plates being made of a compound having an abrasion wear resistance on a predetermined surface thereof that improves abrasion wear characteristics therebetween;
    said compound comprising a base resin material and a filler material; and
    wherein said filler material is highly concentrated at a sealing surface disposed between said impeller and said inlet plate and between said impeller and said outlet plate.

9. A wear resistant fuel pump for a vehicle comprising:
    a pump section having a flow channel and a rotatable impeller cooperating with said flow channel to pump fuel therethrough;
    a motor section disposed adjacent said pump section and having a motor to rotate said impeller;
    an outlet section disposed adjacent said motor section to allow pumped fuel to exit said fuel pump;
    said pump section including a plurality of plates disposed axially adjacent to and cooperating with said impeller, said impeller and said plates being made of a compound having an abrasion wear resistance on a predetermined surface thereof that improves abrasion wear characteristics therebetween;

said compound comprising a base resin material and a filler material; and wherein said base resin material is made of phenolic resin.

10. A wear resistant fuel pump for a vehicle comprising:

a pump section having a flow channel and a rotatable impeller cooperating with said flow channel to pump fuel therethrough;

a motor section disposed adjacent said pump section and having a motor to rotate said impeller;

an outlet section disposed adjacent said motor section to allow pumped fuel to exit said fuel pump;

said pump section including a plurality of plates disposed axially adjacent to and cooperating with said impeller, said impeller and said plates being made of a compound having an abrasion wear resistance on a predetermined surface thereof that improves abrasion wear characteristics therebetween;

said compound comprising a base resin material and a filler material; and wherein said filler material is zirconium oxide with a 40 micron typical particle size.

11. A wear resistant fuel pump for a vehicle comprising:

a housing;

a pump section disposed in said housing having a flow channel and a rotatable impeller cooperating with said flow channel to pump fuel therethrough;

a motor section disposed in said housing adjacent said pump section and having a motor to rotate said impeller;

an outlet section disposed in said housing adjacent said motor section to allow pumped fuel to exit said fuel pump;

said pump section including an inner plate and an outer plate disposed axially adjacent to and cooperating with said impeller, said impeller and said inner plate and said outer plate being made of a compound having an abrasion wear resistance on a predetermined surface thereof that improves abrasion wear characteristics therebetween; and wherein said compound comprises a base resin material and a filler material.

12. A wear resistant fuel pump as set forth in claim 11 including a binder to bind said filler material together to form a porous insert.

13. A wear resistant fuel pump as set forth in claim 12 wherein said filler material has a hardness greater than 65 Rc.

14. A wear resistant fuel pump as set forth in claim 12 wherein said impeller has a hub portion, a plurality of blades disposed circumferentially along said hub portion, and a peripheral ring portion extending radially from said blades having an axial sealing surface on both sides thereof.

15. A wear resistant fuel pump for a vehicle comprising:

a housing;

a pump section disposed in said housing having a flow channel and a rotatable impeller cooperating with said flow channel to pump fuel therethrough;

a motor section disposed in said housing adjacent said pump section and having a motor to rotate said impeller;

an outlet section disposed in said housing adjacent said motor section to allow pumped fuel to exit said fuel pump;

said pump section including an inner plate and an outer plate disposed axially adjacent to and cooperating with said impeller, said impeller and said inner plate and said outer plate being made of a compound having an abrasion wear resistance on a predetermined surface thereof that improves abrasion wear characteristics therebetween;

said compound comprising a base resin material and a filler material;

a binder to bind said filler material together to form a porous insert; and wherein said binder is a low molecular weight phenolic resin.

16. A wear resistant fuel pump for a vehicle comprising:

a housing;

a pump section disposed in said housing having a flow channel and a rotatable impeller cooperating with said flow channel to pump fuel therethrough;

a motor section disposed in said housing adjacent said pump section and having a motor to rotate said impeller;

an outlet section disposed in said housing adjacent said motor section to allow pumped fuel to exit said fuel pump;

said pump section including an inner plate and an outer plate disposed axially adjacent to and cooperating with said impeller, said impeller and said inner plate and said outer plate being made of a compound having an abrasion wear resistance on a predetermined surface thereof that improves abrasion wear characteristics therebetween;

said compound comprising a base resin material and a filler material;

said impeller having a hub portion, a plurality of blades disposed circumferentially along said hub portion, and a peripheral ring portion extending radially from said blades having an axial sealing surface on both sides thereof; and wherein said filler material is highly concentrated at said sealing surface disposed between said impeller and said inlet plate and between said impeller and said outlet plate.

17. A wear resistant fuel pump for a vehicle comprising:

a housing;

a pump section disposed in said housing having a flow channel and a rotatable impeller cooperating with said flow channel to pump fuel therethrough;

a motor section disposed in said housing adjacent said pump section and having a motor to rotate said impeller;

an outlet section disposed in said housing adjacent said motor section to allow pumped fuel to exit said fuel pump;

said pump section including an inner plate and an outer plate disposed axially adjacent to and cooperating with said impeller, said impeller and said inner plate and said outer plate being made of a compound having an abrasion wear resistance on a predetermined surface thereof that improves abrasion wear characteristics therebetween;

said compound comprising a base resin material and a filler material; and wherein said base resin material is made of phenolic resin.

18. A method of introducing abrasion wear resistant filler material to a predetermined surface of interest of plastic plates in a fuel pump for a vehicle comprising:

disposing a filler material against a surface of a mold;

molding a plastic material against the filler material; and forming a plastic plate with a layer of base resin material and a layer of filler material at the predetermined surface thereof.

19. A method as set forth in claim 18 wherein said step of disposing comprises forming a porous insert of filler material.

20. A method as set forth in claim 19 including the step of inserting the porous insert into a cavity of the mold.

21. A method as set forth in claim 18 wherein said step of disposing comprises spraying filler material against a surface of the mold.

22. A method as set forth in claim 18 wherein said step of disposing comprises injecting a compound of filler material in a cavity of the mold.

* * * * *